United States Patent
Hwang et al.

(10) Patent No.: US 10,523,262 B2
(45) Date of Patent: Dec. 31, 2019

(54) COMMUNICATION APPARATUS

(71) Applicant: LG ELECTRONICS INC., Seoul (KR)

(72) Inventors: Joosung Hwang, Seoul (KR); Jeongkyo Seo, Seoul (KR); Sewook Oh, Seoul (KR); Geunseok Jeong, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/310,385

(22) PCT Filed: Jun. 15, 2016

(86) PCT No.: PCT/KR2016/006374
§ 371 (c)(1),
(2) Date: Dec. 14, 2018

(87) PCT Pub. No.: WO2017/217568
PCT Pub. Date: Dec. 21, 2017

(65) Prior Publication Data
US 2019/0334570 A1 Oct. 31, 2019

(51) Int. Cl.
*H04B 1/401* (2015.01)
*H04B 1/44* (2006.01)
*H04B 1/3822* (2015.01)

(52) U.S. Cl.
CPC ........... *H04B 1/401* (2013.01); *H04B 1/3822* (2013.01)

(58) Field of Classification Search
CPC ........ H04B 1/401; H04B 1/3822; H04B 7/26; H04B 7/155; H04B 7/15514; H04W 88/04

USPC ......................................................... 455/15
See application file for complete search history.

(56) References Cited

U.S. PATENT DOCUMENTS

| 7,233,771 B2* | 6/2007 | Proctor, Jr. | ........... H04B 7/1555 370/316 |
| 2011/0175789 A1 | 7/2011 | Lee et al. | |
| 2013/0052974 A1 | 2/2013 | Song et al. | |
| 2013/0107125 A1* | 5/2013 | Conti | ..................... H04H 20/02 348/723 |
| 2017/0367146 A1* | 12/2017 | Ryoke | ................... H04W 16/26 |

FOREIGN PATENT DOCUMENTS

| WO | 2011065773 | 11/2010 |
| WO | 2011010853 | 1/2011 |
| WO | 2011028025 | 3/2011 |

OTHER PUBLICATIONS

PCT International Application No. PCT/KR2016/006374, International Search Report dated Mar. 10, 2017, 4 pages.

* cited by examiner

*Primary Examiner* — Lee Nguyen
(74) *Attorney, Agent, or Firm* — Lee, Hong, Degerman, Kang & Waimey

(57) ABSTRACT

A communication apparatus according to an embodiment of the present invention is configured to determine a frequency band of a communication signal by analyzing a power level of the communication signal detected by a detection unit, and control a band setting unit to set the communication frequency band as the determined frequency band of the communication signal, and determine an output band of the communication signal by analyzing the communication frequency band and a waveform of the communication signal, and control a output setting unit to set a communication output band as the determined output band of the communication signal.

15 Claims, 10 Drawing Sheets

COMMUNICATION APPARATUS

CROSS-REFERENCE TO RELATED APPLICATIONS

This application is the National Stage filing under 35 U.S.C. 371 of International Application No. PCT/KR2016/006374, filed on Jun. 15, 2016, the contents of which are all hereby incorporated by reference herein in their entirety.

TECHNICAL FIELD

The present invention relates to a communication apparatus for processing an uplink signal and a downlink signal, and more particularly, to a communication apparatus for detecting a frequency band of an uplink signal received from a user device and setting a frequency band having a high communication rate, and an operating method thereof.

BACKGROUND ART

Recently, as the tall buildings and the interior space become complicated, the shadow area with a poor radio wave environment in a wireless communication system occurs in all over the building. In addition, in the case of a vehicle, since a vehicle body is entirely made of a metal, a transmission/reception rate of a radio wave is lowered.

As a technique for solving such a problem, a relay is used to improve a poor radio wave environment. The technique using the relay improves a radio wave environment by employing an active relay which uses two antennas and a bidirectional amplification circuit therebetween or a passive relay which connects two antennas through a coaxial cable or a waveguide. More specifically, an antenna is installed outside a building or a vehicle, and the antenna is connected to a re-radiation antenna installed inside the building or the vehicle through a waveguide or a coaxial cable, thereby improving a radio wave environment in a shadow area.

However, since a conventional relay requires a coupler, a band pass filter, and a detection element for each of a plurality of frequency bands so as to confirm a frequency band of a communication signal received from a user device or the like, the conventional relay has a large circuit volume, is expensive, and has low power efficiency.

Therefore, there is a need to develop a communication apparatus for detecting a frequency band without causing such a problem.

DISCLOSURE OF THE INVENTION

Technical Problem

An aspect of the present invention is directed to provide a signal compensator for amplifying a signal received from a coupling antenna inside an automobile, so as to provide a smooth communication rate even inside the automobile.

Another aspect of the present invention is directed to provide a detection circuit miniaturized by using a minimum number of components when receiving an uplink signal from a user device and detecting a frequency band of the uplink signal.

A further another aspect of the present invention is directed to use a switch in a detection unit so that only one coupler and only one power detector are used in a frequency band detection process.

Technical Solution

A communication apparatus according to an embodiment of the present invention comprising a transmission/reception unit configured to transmit and receive a communication signal, a detection unit configured to detect a power level of the communication signal received from the transmission/reception unit, a band setting unit configured to set a communication frequency band, an output setting unit configured to set a communication output band, and a control unit configured to control an operation of the communication apparatus, wherein the control unit is configured to determine a frequency band of the communication signal by analyzing the power level of the communication signal detected by the detection unit, and control the band setting unit to set the communication frequency band as the determined frequency band of the communication signal, and determine an output band of the communication signal by analyzing the communication frequency band and a waveform of the communication signal, and control the output setting unit to set a communication output band as the determined output band of the communication signal.

A communication apparatus according to an another embodiment of the present invention comprising, a transmission/reception unit configured to transmit and receive a communication signal, a band setting unit configured to set a frequency band, a detection unit configured to detect a power level of the communication signal having passed through the band setting unit, an output setting unit configured to set a communication output band, and a control unit configured to control an operation of the communication apparatus, wherein the control unit is configured to determine a frequency band of the communication signal by analyzing the power level detected by the detection unit, and control the band setting unit to set the communication frequency band as the determined frequency band of the communication signal, and determine an output band of the communication signal by analyzing the communication frequency band and a waveform of the communication signal, and control the output setting unit to set a communication output band as the determined output band of the communication signal.

Advantageous Effects

The present invention may have the following effects.

According to one embodiment among various embodiments of the present invention, a signal compensator for amplifying a signal received from a coupling antenna inside an automobile is provided so as to provide a smooth communication rate even inside the automobile.

According to another embodiment among various embodiments of the present invention provides, there is a technical effect of providing a detection circuit miniaturized by using a minimum number of components when receiving an uplink signal from a user device and detecting a frequency band of the uplink signal.

A further another embodiment among various embodiments of the present invention, there is a technical effect of using a switch in a detection unit so that only one coupler and only one power detector are used in a frequency band detection process.

BEST MODE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
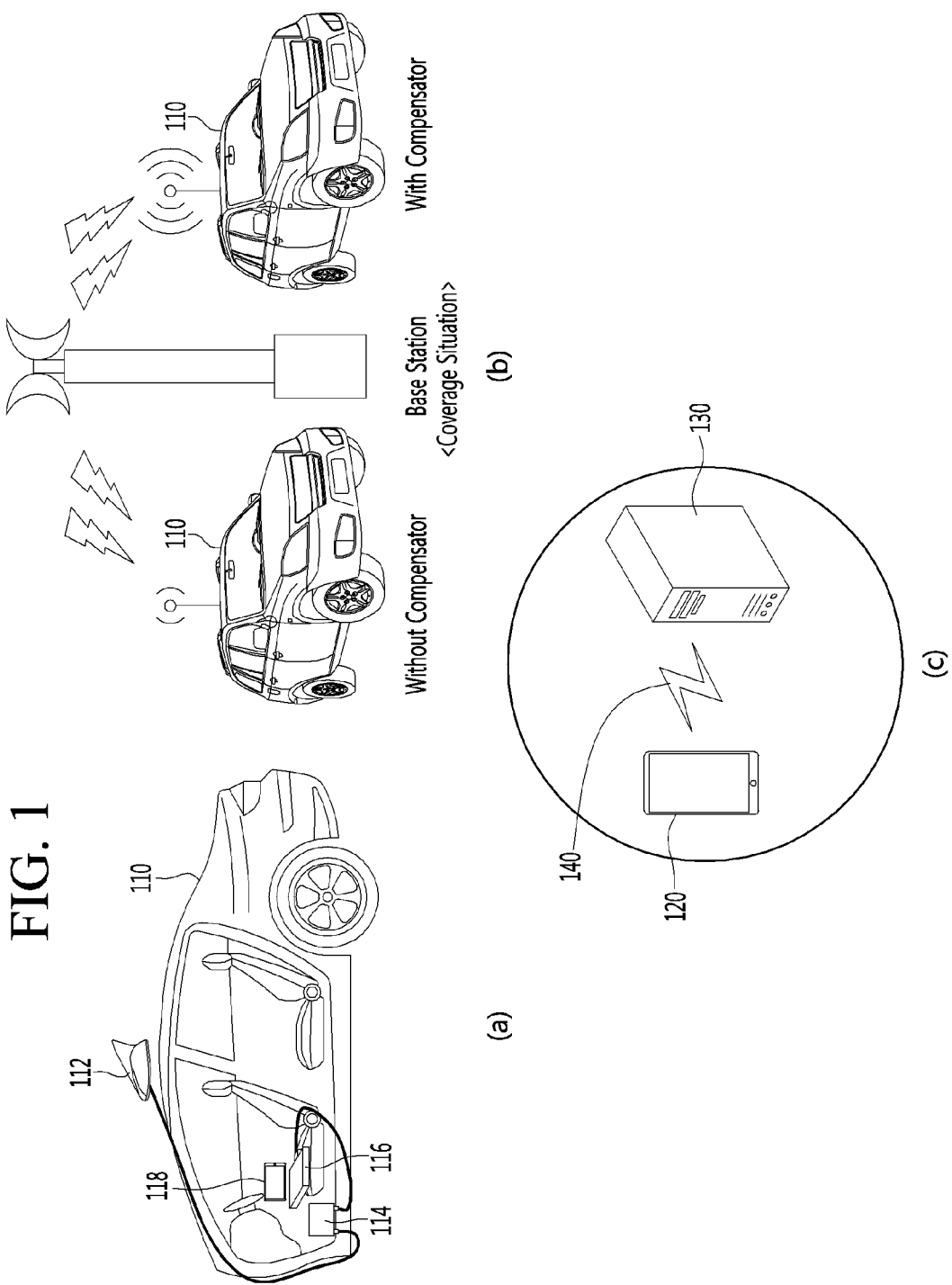
FIG. 1 is a view for describing an example in which a communication apparatus according to an embodiment of the present invention is used in an automobile.

FIG. 1 is a view for describing an example in which a communication apparatus according to an embodiment of the present invention is used in an automobile.

As illustrated in (a) of FIG. 1, when a user device 118 (for example, a smart phone) which is outside an automobile 110 enters the automobile 110, the reception sensitivity is reduced by about 10 dB to about 20 dB. In order to compensate for the reduced reception sensitivity, a communication apparatus 114 such as a signal compensator may be mounted inside the automobile 110. The communication apparatus 114 such as the signal compensator may be connected between a shark antenna 112 mounted outside the automobile 110 and a coupling antenna 116 mounted inside the automobile 110. The communication apparatus 114 such as the signal compensator may receive an external communication signal such as a downlink signal from the shark antenna 112, amplify the received external communication signal, and transmit the amplified external communication signal to the user device 118 through the coupling antenna 116. In addition, the communication apparatus 114 such as the signal compensator may receive a signal of the user device such as an uplink signal from the coupling antenna 116, amplify the received signal, and transmit the amplified signal to a base station through the shark antenna 112. The communication apparatus 114 may serve as a bidirectional amplifier which compensates for a line loss from the shark antenna 112 and a coupling loss between the coupling antenna 116 and the user device 118 and amplifies the uplink signal and the downlink signal at the same time. As illustrated in (b) of FIG. 1, in a case where the user device 118 performs communication inside the automobile 110, the signal output when the communication apparatus 114 such as the signal compensator is present is greater than the signal output when the communication apparatus 114 such as the signal compensator is absent.

(c) of FIG. 1 is a view illustrating an example of a wired/wireless communication network environment to which the present invention is applicable. Referring to (c) of FIG. 1, the wired/wireless communication network environment to which the present invention is applicable may include a user device 120, a server 130, and a network 140. The wired/wireless communication network environment described below includes at least one of components illustrated in (c) of FIG. 1, but is not necessarily limited thereto. One user device, one server, and one network are illustrated in (c) of FIG. 1, but the wired/wireless communication network environment to which the present invention is applicable may include one or more user devices (for example, a first user device and a device of a recommendation user), one or more servers (for example, a management server, a mediation server, a relay server, or a client server), and one or more networks. The user devices and the servers may be connected through different networks. In one embodiment of the present invention, the user device 120 may receive a user selection with respect to a specific button among one or more input buttons within recommendation user information recommended to the user of the user device through an online region, and transmit the received user selection to the server 130. The user device 120 may receive reward or penalty information from the server 130 according to whether the user of the user device has met the recommendation user. Accordingly, in the present invention, the user device 120 may be interpreted as a concept meaning a device capable of transmitting and receiving a communication signal. Examples of the user device 120 may include a terminal, a Mobile Station (MS), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device. These are merely an example, and the user device in the present invention may be interpreted as a concept including any devices capable of transmitting data or signals, which have been commercially developed or are to be developed in the future. Referring again to (c) of FIG. 1, the server 130 refers to an object capable of transmitting and receiving data with at least one another device through the wired/wireless communication network environment, and the server 130 in the present invention may further include a mediation server and/or a client server. In addition, examples of the server 130 a cloud server, an IP Multimedia Subsystem (IMS) server, a Telephony Application server, an Instant Messaging (IM) server, a Media Gateway Control Function (MGCF) server, a Messaging Gateway (MSG) server, and a Call Session Control Function (CSCF) server, and the server 130 may be implemented with a device referring to an object capable of transmitting and receiving data, such as a personal computer (PC), a notebook computer, or a tablet PC. Meanwhile, the network 140 refers to a data communication network for transmission and reception of data, such as texts, digital images, or digital videos, between the user device 120 and the server 130. The type of the network 140 is not particularly limited. For example, the network 140 may be an internet protocol (IP) network that provides a large capacity data transmission and reception service through an IP, or an All IP network that integrates different IP networks. In addition, the network 140 may be a mobile communication network including a wired network, a Wireless Broadband (Wibro) network, and WCDMA, a mobile communication network including a High Speed Downlink Packet Access (HSDPA) network and a Long Term Evolution (LTE) network, a mobile communication network including LTE advance (LTE-A), a satellite communication network, and a Wi-Fi network, or may be a combination of at least one thereof.

Figure 2:
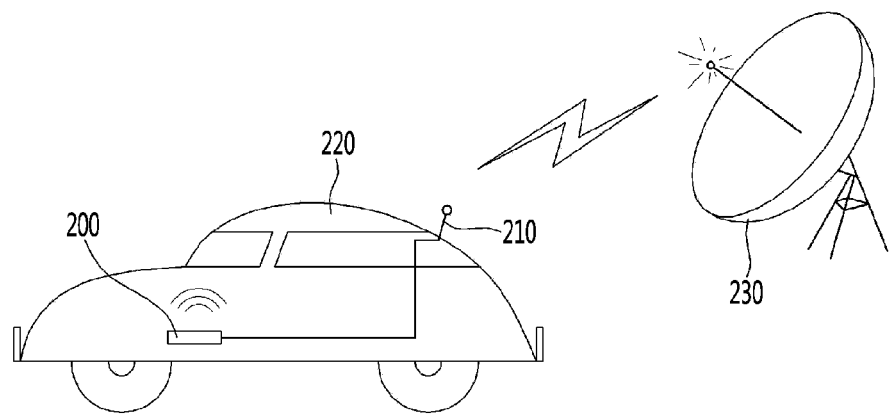
FIG. 2 is a view showing a concept of a coupling antenna 200 connected to the communication apparatus, according to an embodiment of the present invention.

FIG. 2 is a view showing a concept of a coupling antenna 200 connected to the communication apparatus, according to an embodiment of the present invention.

In a user device positioned inside a building or an automobile 220, a radio wave transmitted by a base station 230 collides with a building, or is shielded by a metal constituting the appearance of the automobile 220. Thus, a radio wave transmission/reception rate may be significantly lowered. A region in which a radio wave is not partially transmitted is referred to as a shadow area. A coupling antenna 200 may be provided so as to increase a radio wave transmission/reception rate of the shadow area. An external antenna 210 is provided outside the automobile 220. The radio wave transmission/reception rate of the user device may be increased by transmitting a signal received from the external antenna 210 to the user device positioned inside the automobile 220 through the coupling antenna 200 provided inside the automobile 220. Since the coupling antenna 200 transmits and receives a signal by using an electromagnetic wave, the coupling antenna 200 influences peripheral devices and is influenced by peripheral devices. Therefore, considering a relationship with other peripheral devices, the coupling antenna 200 needs to be disposed at a position that less influences other devices. However, if the distance to the user device is far, the performance of the re-radiation antenna 200 is lowered. Therefore, the coupling antenna 200 may include a wireless charging device so as to minimize the influence of the coupling antenna 200 and the peripheral devices while reducing the distance to the user device.

Figure 3:
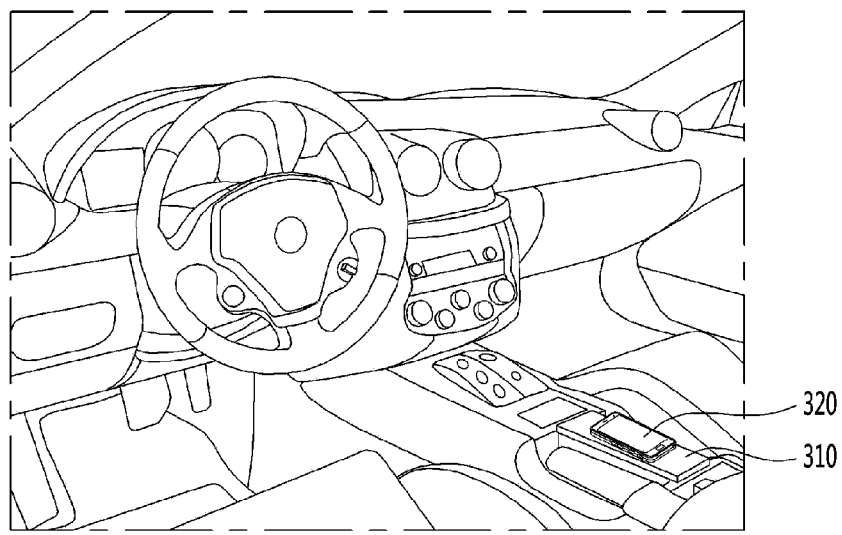
FIG. 3 is a view illustrating a state in which a wireless charging device is held in an automobile.

FIG. 3 is a view illustrating a state in which a wireless charging device is held in an automobile.

A charger which charges a battery of a user device 320 in a wireless charging method has been introduced. The wireless charging method is advantageous in that charging is performed only by holding the user device 320 on the wireless charging device 310 without connecting the wireless charging device and the user device 320 through a cable. In addition, it is possible to reduce the inconvenience of disconnecting a charging cable whenever used. In particular, in a case where the user device 320 is held again while being used, if a cable is plugged and unplugged, it causes an obstruction to driving, and there is a difficulty in use while a cable is plugged. Therefore, the user device 320 may be charged by mounting the wireless charging device 310 on the automobile. In the automobile equipped with the wireless charging device 310, the user device 320 is mostly used in a state of being held on the wireless charging device 310. In addition, since it is highly likely to make a hand-free call using a Bluetooth function in a state of being held during a call, a reception rate of an antenna signal is very important in a state in which the user device 320 is placed on the wireless charging device 310. Therefore, since the coupling antenna must be close to the user device so as to maximize the efficiency of the coupling antenna inside the automobile, the coupling antenna is preferably provided in the wireless charging device itself.

Figure 4:
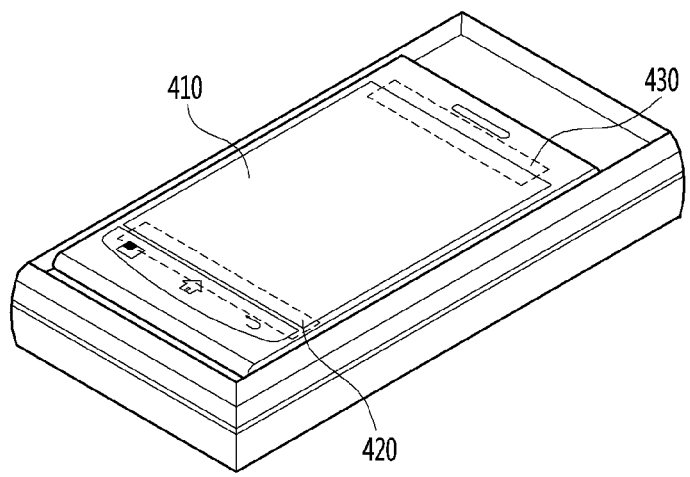
FIG. 4 is a view illustrating a state in which a user device is held in a wireless charging device.

FIG. 4 is a view illustrating a state in which a user device is held in a wireless charging device.

The user device 410 may include various wireless communication units. The user device 410 may be a broadcast reception module for broadcast reception, a mobile communication module for mobile communication, a wireless Internet module for wireless Internet, a short-range wireless communication module for transmitting and receiving data with an external device positioned at a short distance in a wireless communication scheme, a position information module for acquiring the position of the user device 410, or the like. The broadcast reception module receives broadcast signals and broadcast-related information from an external broadcast management server through a broadcast channel. The broadcast-related information may exist in various forms, for example, Electronic Program Guide (EPG) of Digital Multimedia Broadcasting (DMB) or Electronic Service Guide (ESG) of Digital Video Broadcast-Handheld (DVB-H). An antenna is required so as to receive the broadcast-related information. In the case of the broadcast reception module, a monopole type antenna that is retractable in the user device 410 may be used. The mobile communication module transmits and receives a wireless signal to and from at least one of a base station, an external terminal, and a server on a mobile communication network established in accordance with technological standards or communication schemes for mobile communication (for example, Global System for Mobile communication (GSM), Code Division Multiple Access (CDMA), Code Division Multiple Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), or the like). The wireless signal may include a voice call signal, a video call signal, or various types of data according to text or multimedia message transmission and reception. Since an antenna for mobile communication manages the main function of the user device 410, the antenna may be referred to as a main antenna. Since different frequencies are used for each technological standard of various mobile communications, a need for a broadband antenna is increasing. There are many cases where the user uses the user device 410 while directly contacting his or her ear during a call. When the antenna is positioned at the upper portion of the user device 410, transmission and reception of a radio wave occurs near a user's brain. Therefore, in order to place the distance as far away as possible, the main antenna is disposed at a lower end 420 of the user device 410 or a position close to a voice reception unit. Since other wireless communication schemes are not often used in a state of being directly adjacent to a user's ear, the main antenna may be disposed on an upper portion 430 or a rear surface of the user device 410. The wireless Internet module refers to a module for wireless Internet connection, and may be embedded in the user device 410, or may be attached to the outside of the user device 410. The wireless Internet module is configured to transmit and receive a wireless signal in a communication network according to wireless Internet technologies. Examples of the wireless Internet technology include Wireless LAN (WLAN), Wireless-Fidelity (Wi-Fi), and Wi-Fi Direct, and the wireless Internet module transmits and receives data in accordance with at least one wireless Internet technology in the range including up to Internet technologies that are not listed above. From the viewpoint that the wireless Internet connection by means of WiBro, HSDPA, HSUPA, GSM, CDMA, WCDMA, LTE, or LTE-A is performed through the mobile communication network, the wireless Internet module that performs the wireless Internet connection through the mobile communication network may be understood as a type of the mobile communication module. The short-range communication module is provided for short-range communication, and may support wireless communication between the user device 410 and the wireless communication system, wireless communication between the display device 410 and another user device, or wireless communication between the user device 410 and another user device (or an external server) through short-range wireless communication networks (wireless area networks). The short-range wireless communication networks may be wireless personal area networks. The position information module is a module for acquiring the position (or current position) of the user device 410. Representative examples of the position information module may be a Global Positioning System (GPS) module or a Wireless Fidelity (Wi-Fi) module. For example, when the GPS module is used, the user device 410 may acquire the position of the user device 410 by using a signal transmitted by a GPS satellite. As another example, when the Wi-Fi module is used, the user device 410 may acquire the position of the user device 410 based on information of a wireless access point (AP) that transmits to or receive from the Wi-Fi module. Other parts are positioned at the middle portion of the user device 410. Therefore, when the user grips the user device 410, a radio wave is disturbed and a reception rate is lowered. Hence, it is general that the antennas are separately disposed at the upper portion and the lower portion of the user device 410. Exceptionally, since an extremely proximity antenna such as NFC or RFID is used while directly contacting the user device 410, it may be disposed on the rear surface of the user device 410.

Figure 5:
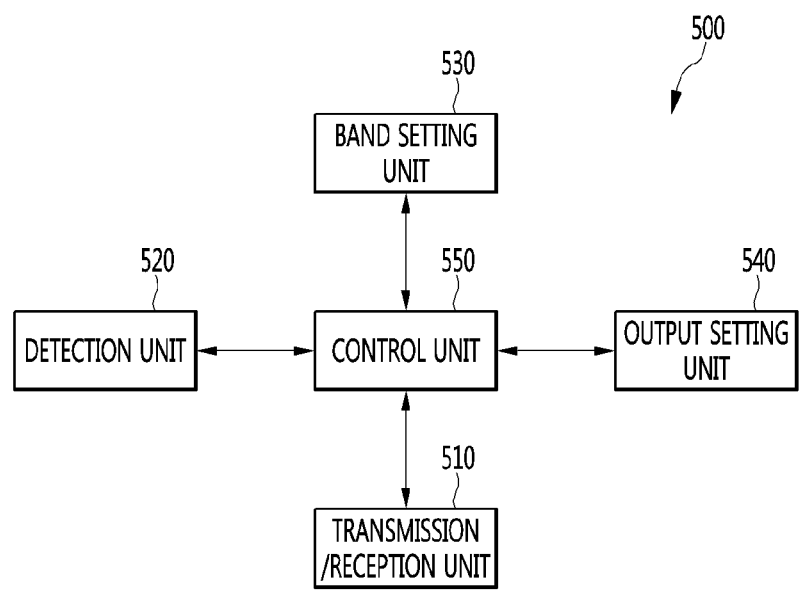
FIG. 5 is a block diagram illustrating a configuration of a communication apparatus according to an embodiment of the present invention.

FIG. 5 is a block diagram illustrating a configuration of a communication apparatus according to an embodiment of the present invention.

As illustrated in FIG. 5, a communication apparatus 500 according to an embodiment of the present invention may include: a transmission/reception unit 510 that transmits and receives a communication signal; a detector or detection unit 520 that detects a power level of the communication signal received from the transmission/reception unit 510; a band setter or band setting unit 530 that sets a communication frequency band; an output setter or output setting unit 540 that sets a communication output band; and a control unit 550 that controls the operation of the communication apparatus 500. The control unit 550 may perform control such that the frequency band of the communication signal is determined by analyzing the power level detected by the detection unit 520 and the band setting unit 530 sets the communication frequency band to the determined frequency band of the communication signal, and perform control such that the output band of the communication signal is determined by analyzing the communication frequency band and the waveform of the communication signal, and the output setting unit 540 sets the communication output band to the determined output band of the communication signal. The communication frequency band supported by the communication apparatus 500 according to the embodiment of the present invention may include Band 1, Band 3, Band 7, Band 8, and Band 20. The detection unit 520 of the communication apparatus 500 according to the embodiment of the present invention may include a single coupler, a first switch, a second switch, a first band pass filter, a second band pass filter, a third band pass filter, a fourth band pass filter, a fifth band pass filter, and a single power detector. The detection unit 520 of the communication apparatus 500 according to the embodiment of the present invention may connects the first switch and the second switch to the corresponding band pass filters for a preset time, and the power detector may determine whether the power level of the signal having passed through the band pass filter exceeds a preset power level. The control unit 550 of the communication apparatus 500 according to the embodiment of the present invention may determine, as the frequency band of the communication signal, the frequency band of the band pass filter having passed the signal exceeding the preset power level, based on the detection result of the power detector. The communication output band set by the output setting unit 540 of the communication apparatus 500 according to the embodiment of the present invention may include Band 1, Band 3, Band 7, Band 8, Band 20, GSM900, and GSM1800. The band setting unit 530 of the communication apparatus 500 according to the embodiment of the present invention may include a third switch, a fourth switch, a first band pass filter, a second band pass filter, a third band pass filter, a fourth band pass filter, and a fifth band pass filter. The control unit 550 may perform control such that the third switch and the fourth switch are connected to the band pass filter corresponding to the frequency band of the communication signal detected by the detection unit 520. When a frequency band change signal is received from the detection unit 520, the control unit 550 of the communication apparatus 500 according to the embodiment of the present invention may perform control such that the third switch and the fourth switch are connected to the band pass filters selected corresponding to the frequency band change signal.

A communication apparatus 500 according to another embodiment of the present invention may include: a transmitter/receiver, transceiver, or transmission/reception unit 510 that transmits and receives a communication signal; a band setter or band setting unit 530 that sets a communication frequency band; a detector or detection unit 520 that detects a power level of the communication signal having passed through the band setting unit 530; an output setter or output setting unit 540 that sets a communication output band; and a controller or control unit 550 that controls the operation of the communication apparatus 500. The control unit 550 may perform control such that the frequency band of the communication signal is determined by analyzing the power level detected by the detection unit 520 and the band setting unit 530 sets the communication frequency band to the determined frequency band of the communication signal, and perform control such that the output band of the communication signal is determined by analyzing the communication frequency band and the waveform of the communication signal, and the output setting unit 540 sets the communication output band to the determined output band of the communication signal. Circuit elements constituting each block illustrated in FIG. 5 will be described in detail with reference to FIGS. 6 to 9 and 11.

Figure 6:
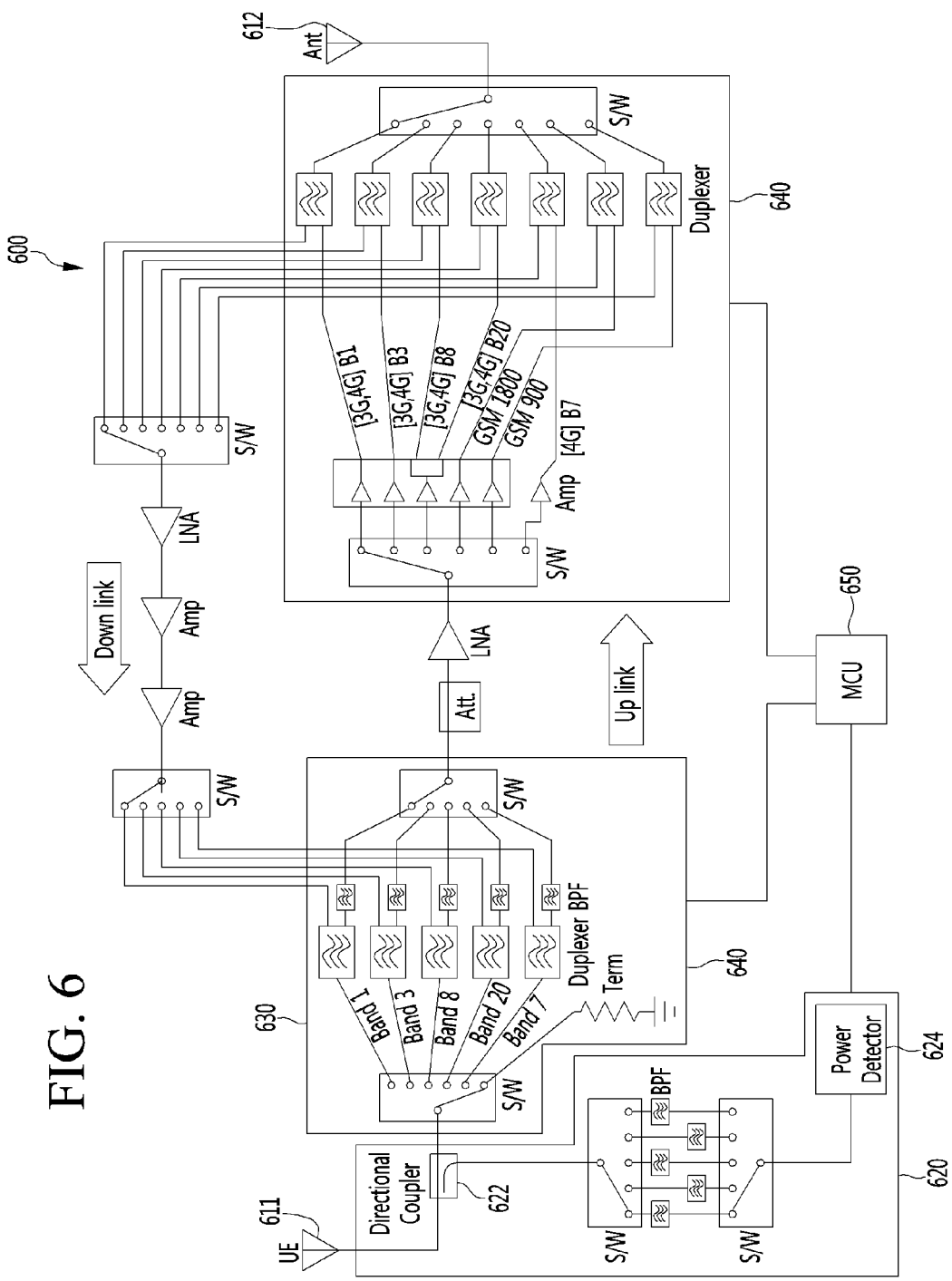
FIG. 6 is a view for describing a circuit configuration of a communication apparatus according to an embodiment of the present invention.

FIG. 6 is a view for describing a circuit configuration of a communication apparatus according to an embodiment of the present invention.

As illustrated in FIG. 6, the communication apparatus 600 according to the embodiment of the present invention may include: transmitter/receiver, transceiver, or transmission/reception units 611 and 612 that transmit and receive communication signals; a detector or detection unit 620 that measures power levels of the communication signals received from the transmission/reception units; a band setter or band setting unit 630 that sets a communication frequency band; an output setter or output setting unit 640 that sets a communication output band; and a controller or control unit 650 that controls the respective units of the communication apparatus 600.

The circuit of the detection unit 620 of the communication apparatus 600 according to the embodiment of the present invention may be configured such that the communication signal is transmitted to a power detector 624 by using a coupler 622 in the process of being received through the transmission/reception unit 611 and transmitted to the band setting unit 630. The power detector 624 may detects the frequency band by detecting the power level of the communication signal having passed through the band pass filter corresponding to each frequency band, and the detection unit 620 will be described in more detail with reference to FIG. 7.

The band setting unit 630 of the communication apparatus 600 according to the embodiment of the present invention may include may include a third switch, a fourth switch, a first band pass filter, a second band pass filter, a third band pass filter, a fourth band pass filter, and a fifth band pass filter such that the communication frequency band is set according to the frequency band determined in the power detection process of the power detector 624 of the detection unit 620. The frequency band according to the embodiment of the present invention may include Band 1, Band 3, Band 7, Band 8, and Band 20. The first band pass filter, the second band pass filter, the third band pass filter, the fourth band pass filter, and the fifth band pass filter may correspond to Band 1, Band 3, Band 7, Band 8, and Band 20, respectively. The control unit 650 of the communication apparatus 600 according to the embodiment of the present invention may perform control such that the third switch and the fourth switch are connected to the band pass filter corresponding to the frequency band of the communication signal detected by the detection unit 620, and the communication signal is transmitted to the transmission unit through the band setting unit 630. The band setting unit 630 will be described in more detail with reference to FIG. 7.

The output setting unit 640 of the communication apparatus 600 according to the embodiment of the present invention is a circuit part configured to set the output of the communication signal having passed through the band setting unit 630. The control unit 650 may perform control such that the output band of the communication signal is determined by analyzing the communication frequency band and the waveform of the communication signal, and the output setting unit 640 sets the communication output band to the determined output band of the communication signal. The communication output band may distinguish 2G communication, 3G communication, and 4G communication, and include Band 1, Band 3, Band 7, Band 8, Band 20, GSM900, and GSM1800. The output setting unit 640 will be described in more detail with reference to FIG. 9.

Figure 7:
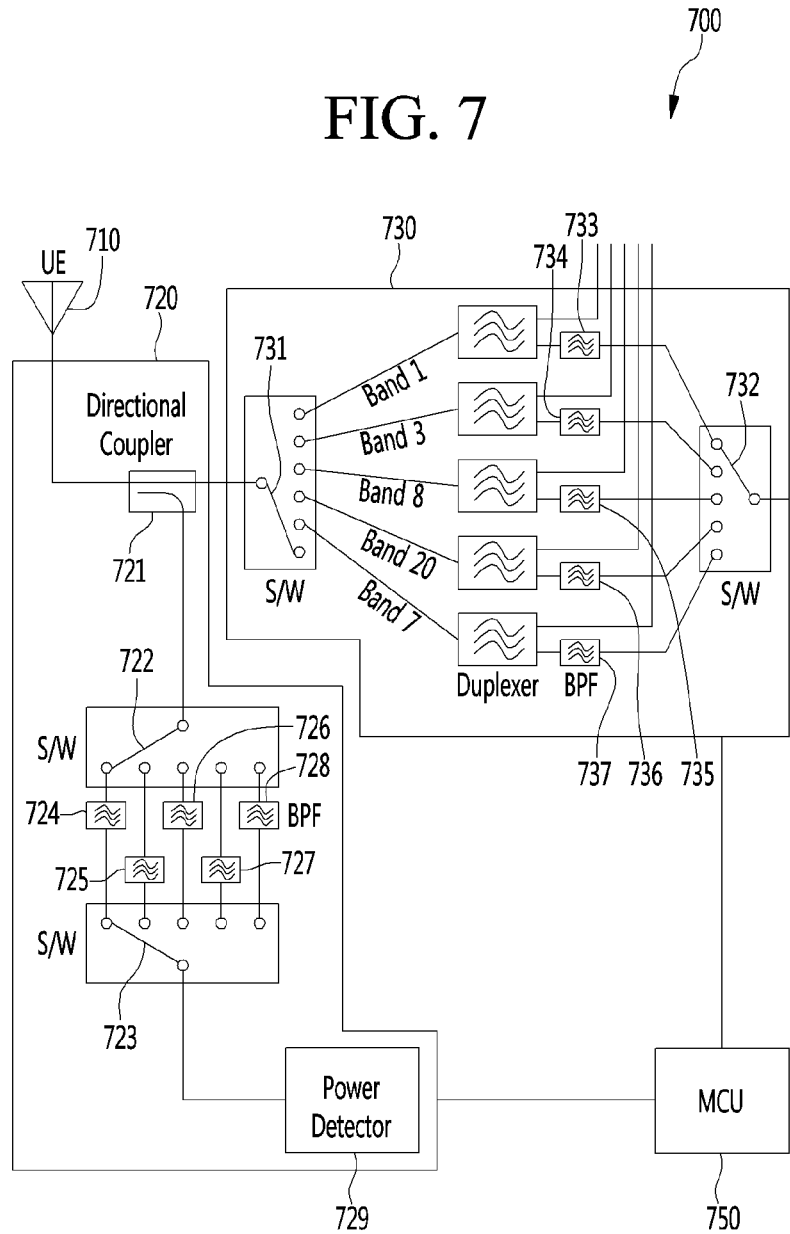
FIG. 7 is a view for describing a detection unit and a band setting unit of a communication apparatus according to an embodiment of the present invention.

FIG. 7 is a view for describing a detection unit and a band setting unit of a communication apparatus according to an embodiment of the present invention.

As illustrated in FIG. 7, the communication apparatus 700 according to the embodiment of the present invention may include a transmitter/receiver, transceiver, or transmission/reception unit 710, a detector or detection unit 720, a band setter or band setting unit 730, and a controller or control unit 750. The communication apparatus 700 may receive a communication signal from a user device through a first antenna 710. The communication signal received from the user device may be an uplink signal. The communication signal received through the first antenna 710 may be transmitted to the detection unit 720 through a coupler 721. The detection unit 720 may include a first switch 722, a second switch 723, a first band pass filter 724, a second band pass filter 725, a third band pass filter 726, a fourth band pass filter 727, a fifth band pass filter 728, and a power detector 729. The first switch 722 and the second switch 723 may be switched between the first band pass filter 724, the second band pass filter 725, the third band pass filter 726, the fourth band pass filter 727, and the fifth band pass filter 728 more quickly than a duty cycle of the communication signal. In this case, when the first switch 722 and the second switch 723 are connected to the first band pass filter 724, the power detector 729 may detects a power level of a first band signal. When the first switch 722 and the second switch 723 are connected to the second band pass filter 725, the power detector 729 may detects a power level of a second band signal. When the first switch 722 and the second switch 723 are connected to the third band pass filter 726, the power detector 729 may detects a power level of a third band signal. When the first switch 722 and the second switch 723 are connected to the fourth band pass filter 727, the power detector 729 may detects a power level of a fourth band signal. When the first switch 722 and the second switch 723 are connected to the fifth band pass filter 728, the power detector 729 may detects a power level of a fifth band signal. The control unit 729 may detect the frequency band of the communication signal received from the first antenna 710 by determining whether the power levels of the first band signal, the second band signal, the third band signal, the fourth band signal, and the fifth band signal detected by the power detector 729 exceed a preset power level. The control unit 750 of the communication apparatus 700 may determine, as the frequency band of the communication signal, the frequency band of the band pass filter having passed the signal exceeding the preset power level, based on the detection result of the power detector 729. The band setting unit 730 may include a third switch 731, a fourth switch 732, a first band pass filter 733, a second band pass filter 734, a third band pass filter 735, a fourth band pass filter 736, and a fifth band pass filter 737. The control unit 750 may perform control such that the third switch 731 and the fourth switch 732 are connected to the band pass filter corresponding to the frequency band of the communication signal detected by the detection unit 720. In addition, the detection unit 720 may detect, in real time, the frequency band of the communication signal received in real time through the first antenna 710, and may transmit a frequency band change signal to the control unit 750 when a communication signal of a frequency band different from a preset frequency band is detected. When the frequency band change signal is received from the detection unit 720, the control unit 750 of the communication apparatus 700 may perform control such that communication is smoothly performed by connecting the third switch 731 and the fourth switch 732 to a new band pass filter selected corresponding to the frequency band change signal.

Figure 8:
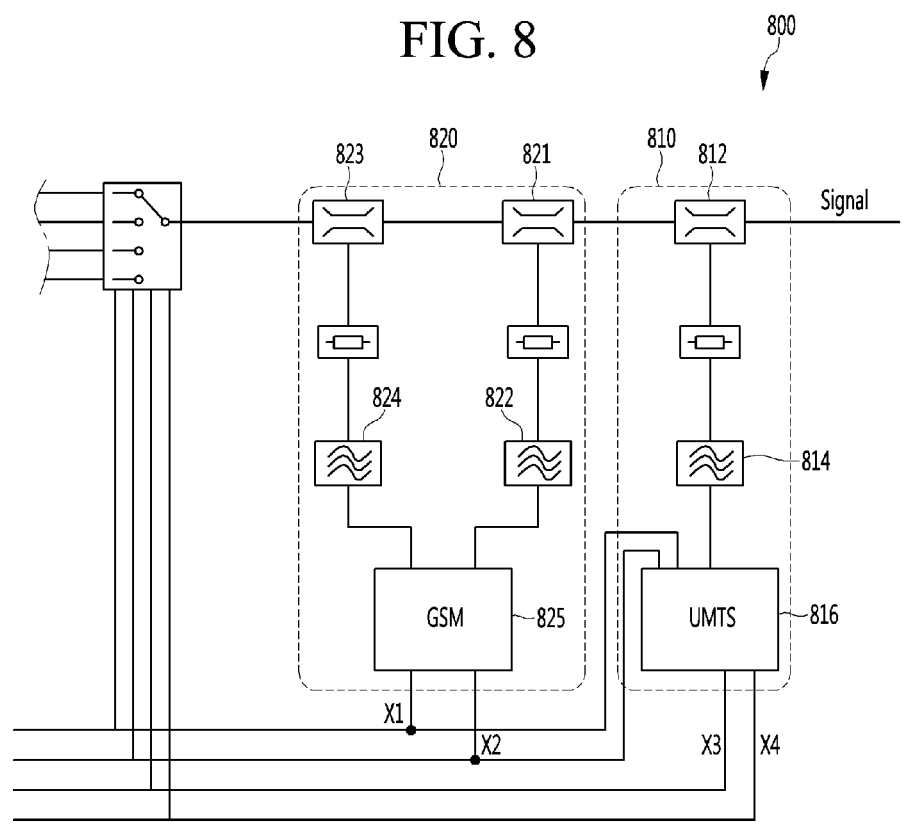
FIG. 8 is a view for describing the related art for detecting a frequency band of a communication signal.

FIG. 8 is a view for describing the related art for detecting a frequency band of a communication signal.

As illustrated in FIG. 8, a detection circuit for each frequency band is configured so as to detect a frequency band of a communication signal. For example, a first detection circuit 810 may include a first coupler 812, a first band pass filter 814, and a first power detector 816, and a second detection circuit 820 may include a second coupler 821, a second band pass filter 822, a third coupler 823, a third band pass filter 824, and a second power detector 825. Therefore, when a communication signal is received through a transmission/reception unit, the first power detector 816 of the first detection circuit 810 detects power of a signal corresponding to a first frequency band through the first coupler 812, the second power detector 825 of the second detection circuit 820 detects power of a signal corresponding to a second frequency band through the second coupler 821, and the second power detector 825 of the second detection circuit 820 detects a signal corresponding to a third frequency band through the third coupler 823. Therefore, there is a disadvantage that the coupler and the power detector must be separately configured for each frequency band so as to detect the frequency band of the received communication signal. Compared with the conventional communication apparatus 800 of FIG. 8, the communication apparatus 700 of FIG. 7 according to the present invention has a technical advantage that signal measurement is possible for five frequency bands only by one coupler 721 and one power detector 729. Therefore, since the detection unit can be implemented only by one coupler and one power detector, the present invention has a technical effect of providing a miniaturized detection circuit by using a minimum number of components.

Figure 9:
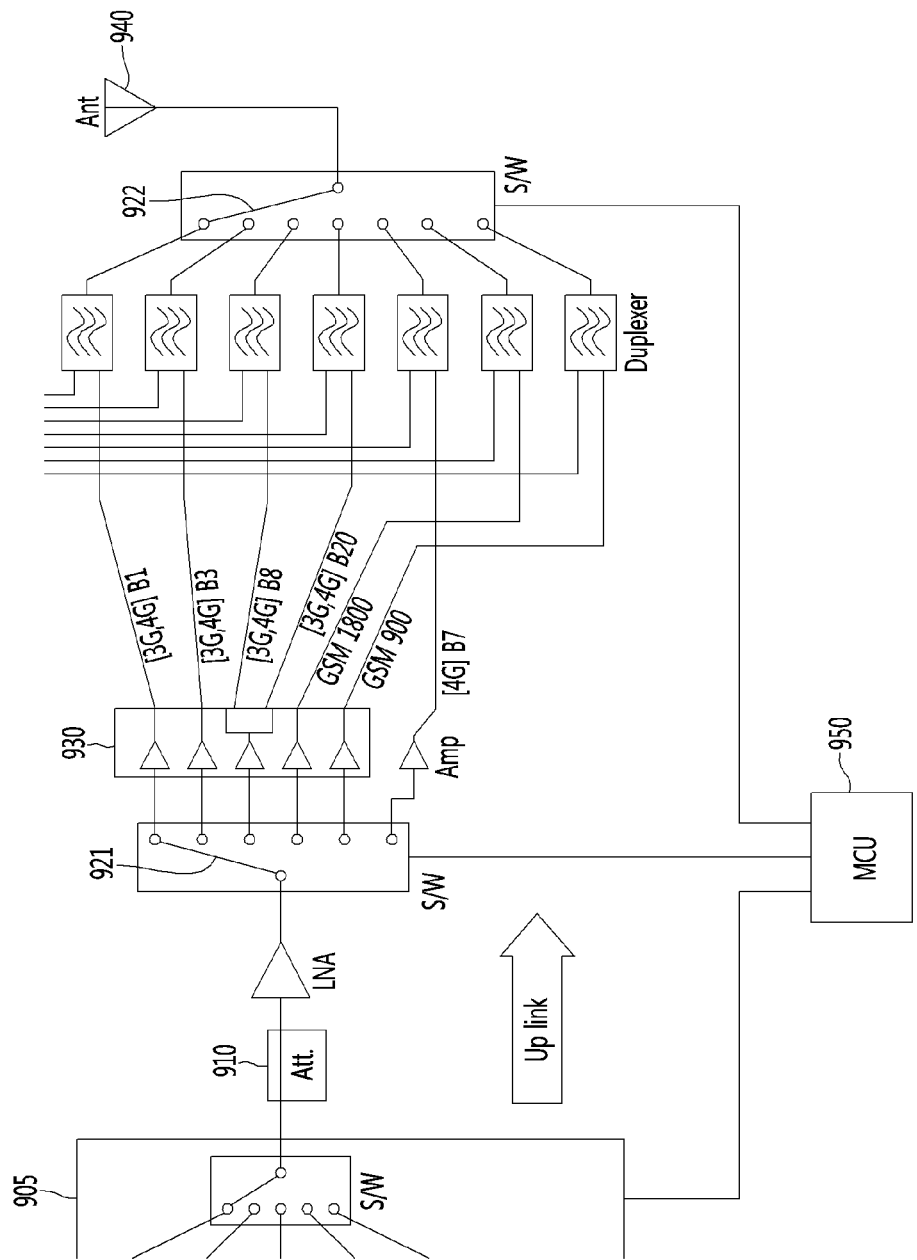
FIG. 9 is a view for describing an output setting unit of a communication apparatus according to an embodiment of the present invention.

FIG. 9 is a view for describing an output setter or output setting unit of a communication apparatus according to an embodiment of the present invention.

As illustrated in FIG. 9, an output setting unit of the communication apparatus 900 according to the embodiment of the present invention may include a fifth switch 921, a sixth switch 922, an amplifier module 930, and a second antenna 940. As illustrated in FIG. 9, a communication signal transmitted through a band setter or band setting unit 905 may pass through an attenuator, and the signal having passed through the attenuator may pass through a low-noise amplifier. The control unit 950 of the communication apparatus 900 may determine the output band of the communication signal by analyzing the waveform of the communication signal and the communication frequency band set by the band setting unit 905, and may control the fifth switch 921 and the sixth switch 922 such that the output setting unit sets the communication output band to the determined output band of the communication signal. The output band may include Band 1, Band 3, Band 7, Band 8, Band 20, GSM900, and GSM1800. The output band corresponding to the 2G communication is GSM900 and GSM1800. The output band corresponding to the 3G communication or the 4G communication is Band 1, Band 3, Band 7, Band 8, and Band 20. In the mobile communication, maximum uplink output power is 33 dBm in GSM900 that is the 2G communication in 3GPP, 30 dBm in GSM1800, 24 dBm in the 3G communication, and 23 dBm in the 4G communication. Therefore, the control unit 950 of the communication apparatus 900 may perform control such that the frequency band of the communication signal and the signal waveform are analyzed and signals are transmitted through output bands distinguished from each other. When the fifth switch 921 and the sixth switch 922 are connected according to the determined output band, the communication signal may pass through a duplexer and be transmitted through a second antenna 940.

Figure 10:
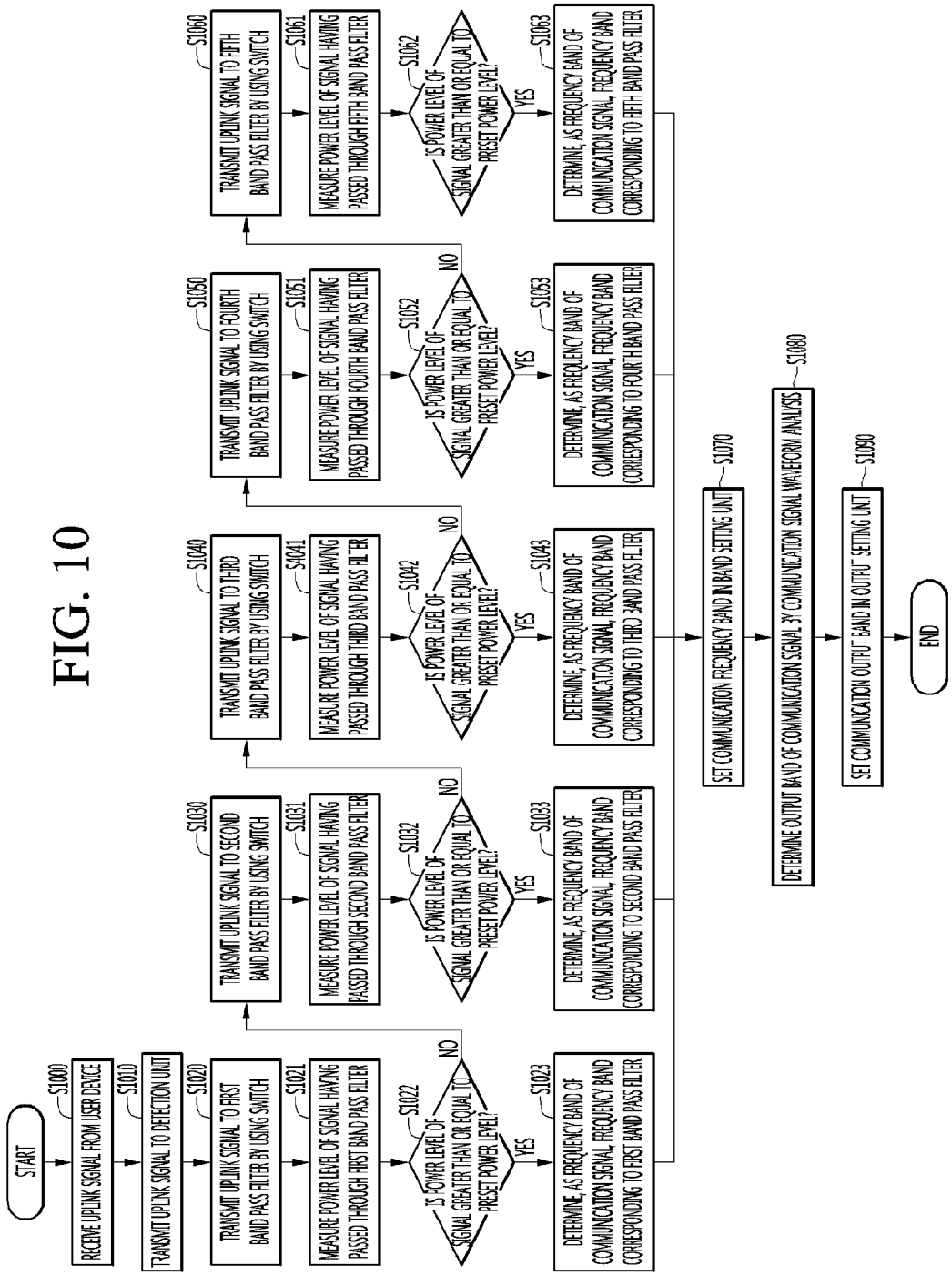
FIG. 10 is a flowchart for describing a control method of a communication apparatus according to an embodiment of the present invention.

FIG. 10 is a flowchart for describing a control method of a communication apparatus according to an embodiment of the present invention.

As illustrated in FIG. 10, the communication apparatus according to the embodiment of the present invention receives an uplink signal from a user device through a first antenna (S1000), transmits the received uplink signal to a detector or detection unit (S1010), transmits the uplink signal to a first band pass filter by using a switch (S1020), measures a power level of the signal having passed through the first band pass filter (S1021), determines whether the power level of the signal having passed through the first band pass filter is greater than or equal to a preset power level (S1022), determines, as a frequency band of a communication signal, a frequency band corresponding to the first band pass filter when it is determined that the power level of the signal is greater than or equal to the preset power level (S1023), and transmits the uplink signal to a second band pass filter by using a switch when it is determined that the power level of the signal is less than the preset power level (S1030). The communication apparatus measures a power level of the signal having passed through the second band pass filter (S1031), determines whether the power level of the signal having passed through the second band pass filter is greater than or equal to a preset power level (S1032), determines, as a frequency band of a communication signal, a frequency band corresponding to the second band pass filter when it is determined that the power level of the signal is greater than or equal to the preset power level (S1033), and transmits the uplink signal to a third band pass filter by using a switch when it is determined that the power level of the signal is less than the preset power level (S1040). The communication apparatus measures a power level of the signal having passed through the third band pass filter (S1041), determines whether the power level of the signal having passed through the third band pass filter is greater than or equal to a preset power level (S1042), determines, as a frequency band of a communication signal, a frequency band corresponding to the third band pass filter when it is determined that the power level of the signal is greater than or equal to the preset power level (S1043), and transmits the uplink signal to a fourth band pass filter by using a switch when it is determined that the power level of the signal is less than the preset power level (S1050). The communication apparatus measures a power level of the signal having passed through the fourth band pass filter (S1051), determines whether the power level of the signal having passed through the fourth band pass filter is greater than or equal to a preset power level (S1052), determines, as a frequency band of a communication signal, a frequency band corresponding to the fourth band pass filter when it is determined that the power level of the signal is greater than or equal to the preset power level (S1053), and transmits the uplink signal to a fifth band pass filter by using a switch when it is determined that the power level of the signal is less than the preset power level (S1060). The communication apparatus measures a power level of the signal having passed through the fifth band pass filter (S1061), determines whether the power level of the signal having passed through the fifth band pass filter is greater than or equal to a preset power level (S1062), and determines, as a frequency band of a communication signal, a frequency band corresponding to the fifth band pass filter when it is determined that the power level of the signal is greater than or equal to the preset power level (S1063). When the frequency band is determined, the band setting unit sets the communication frequency band (S1070), the output band of the communication signal is determined through a communication signal waveform analysis (S1080), and the output setting unit sets the communication output band (S1090). Since details thereof are the same as described above, a redundant description thereof will be omitted.

Figure 11:
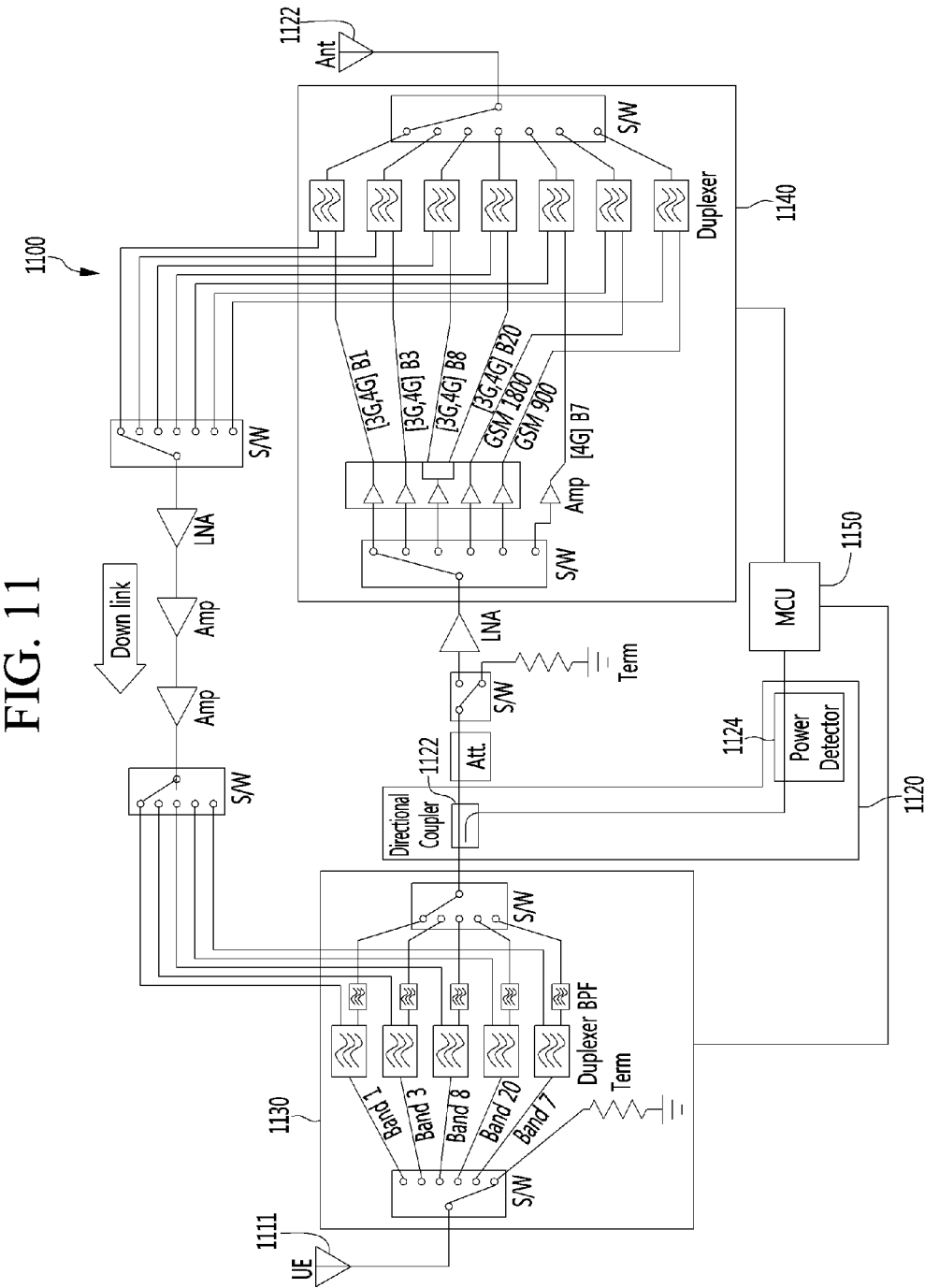
FIG. 11 is a view for describing a circuit configuration of a communication apparatus according to another embodiment of the present invention.

FIG. 11 is a view for describing a circuit configuration of a communication apparatus according to another embodiment of the present invention.

As illustrated in FIG. 11, the communication apparatus 1100 according to the embodiment of the present invention may include: transmission/reception units 1111 and 1112 that transmit and receive a communication signal; a detector or detection unit 1120 that measures a power level of the communication signal received from the transmission/reception units 1111 and 1112; a band setter or band setting unit 1130 that sets a communication frequency band; an output setter or output setting unit 1140 that sets a communication output band; and a controller or control unit 1150 that controls the respective units of the communication apparatus 1100.

The circuit of the detection unit 1120 of the communication apparatus 1100 according to another embodiment of the present invention may be configured such that the communication signal is transmitted to a power detector 1124 by using a coupler 1122 in the process of being transmitted to the output setting unit 1140 through the band setting unit 1130 The power detector 1124 may detect the frequency band by detecting the power of the communication signal having passed through a band pass filter corresponding to each frequency band. The band setting unit 1130 of the communication apparatus 1100 according to another embodiment of the present invention may pass a signal matching each frequency band by connecting an uplink signal received from a user device to a band pass filter and a duplexer of each frequency band through a switch element. The switch element may switch five frequency bands at a fast speed. The control unit 1150 may detect a frequency band, at which a maximum power level is detected, through two measurements. According to another embodiment of the present invention, the frequency band may include Band 1, Band 3, Band 7, Band 8, and Band 20, and a first band pass filter, a second band pass filter, a third band pass filter, a fourth band pass filter, and a fifth band pass filter may correspond to Band 1, Band 3, Band 7, Band 8, and Band 20, respectively. The control unit 1150 of the communication apparatus 1100 according to another embodiment of the present invention may perform control such that a third switch and a fourth switch are connected and fixed to a band pass filter corresponding to the frequency band of the communication signal detected by the detection unit 1120, and the communication signal is transmitted to a transmission unit through the band setting unit 1130. The output setting unit 1140 of the communication apparatus 1100 according to another embodiment of the present invention is a circuit part configured to set the output of the communication signal having passed through the band setting unit 1130 and the detection unit 1120. The control unit 1150 may perform control such that the output band of the communication signal is determined by analyzing the communication frequency band and the waveform of the communication signal, and the output setting unit 1140 sets the communication output band to the determined output band of the communication signal. The communication output band may include Band 1, Band 3, Band 7, Band 8, Band 20, GSM900, and GSM1800 by distinguishing the 2G communication, the 3G communication, and the 4G communication.

Unlike the communication apparatus designed as illustrated in FIG. 6 according to the present invention, the communication apparatus designed as illustrated in FIG. 11 according to the present invention includes one coupler and one power detector without a switch element and a band pass filter in the detection unit, thereby achieving a technical effect of having a more compact profile and higher power consumption efficiency than the communication apparatus of FIG. 6.

Figure 12:
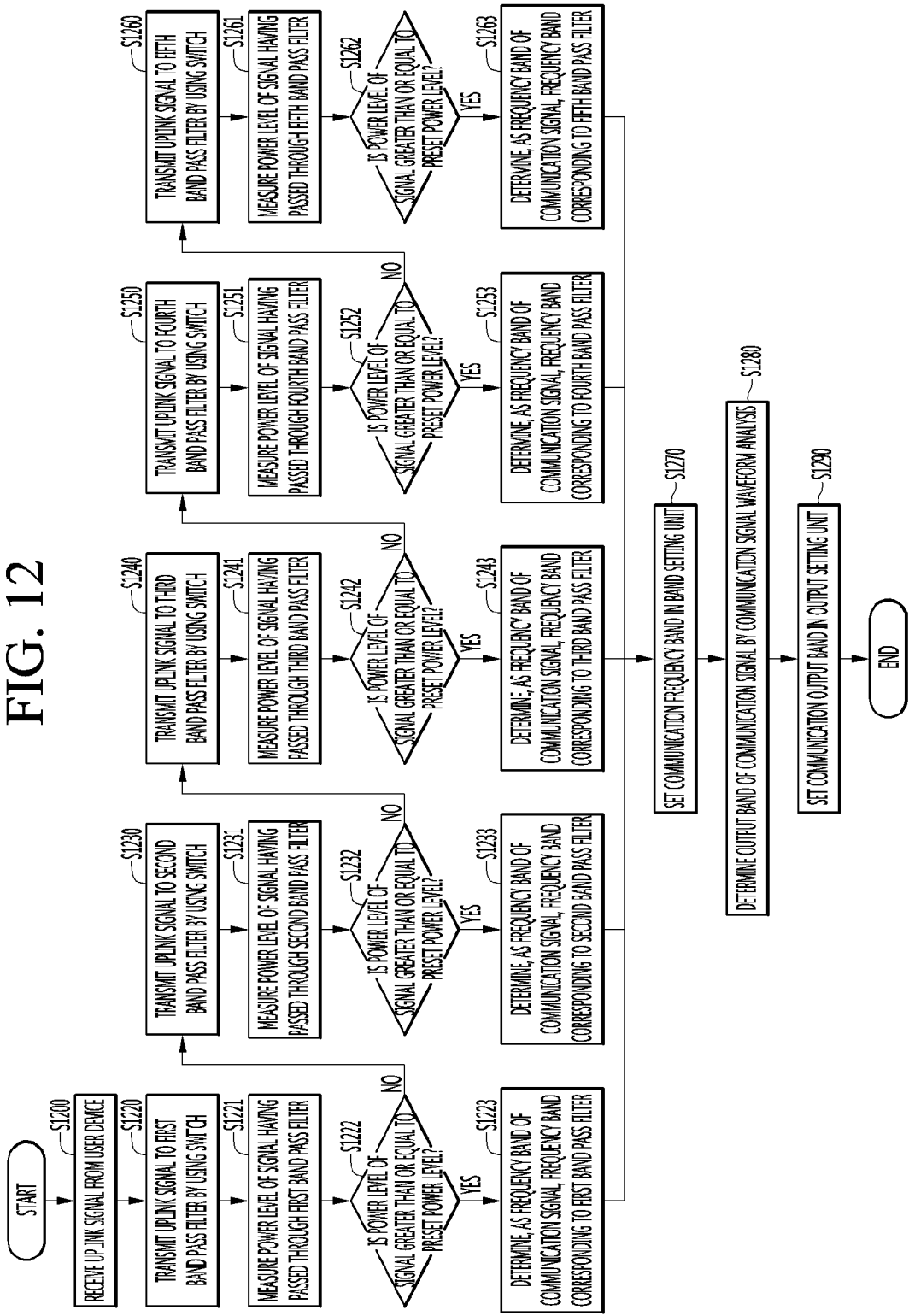
FIG. 12 is a flowchart for describing a control method of a communication apparatus according to another embodiment of the present invention.

FIG. 12 is a flowchart for describing a control method of a communication apparatus according to another embodiment of the present invention.

As illustrated in FIG. 12, the communication apparatus according to another embodiment of the present invention receives an uplink signal from a user device through a first antenna (S1200), transmits the uplink signal to a first band pass filter by using a switch (S1220), measures a power level of the signal having passed through the first band pass filter (S1221), determines whether the power level of the signal having passed through the first band pass filter is greater than or equal to a preset power level (S1222), determines, as a frequency band of a communication signal, a frequency band corresponding to the first band pass filter when it is determined that the power level of the signal is greater than or equal to the preset power level (S1223), and transmits the uplink signal to a second band pass filter by using a switch when it is determined that the power level of the signal is less than the preset power level (S1230). The communication apparatus measures a power level of the signal having passed through the second band pass filter (S1231), determines whether the power level of the signal having passed through the second band pass filter is greater than or equal to a preset power level (S1232), determines, as a frequency band of a communication signal, a frequency band corresponding to the second band pass filter when it is determined that the power level of the signal is greater than or equal to the preset power level (S1233), and transmits the uplink signal to a third band pass filter by using a switch when it is determined that the power level of the signal is less than the preset power level (S1240). The communication apparatus measures a power level of the signal having passed through the third band pass filter (S1241), determines whether the power level of the signal having passed through the third band pass filter is greater than or equal to a preset power level (S1242), determines, as a frequency band of a communication signal, a frequency band corresponding to the third band pass filter when it is determined that the power level of the signal is greater than or equal to the preset power level (S1243), and transmits the uplink signal to a fourth band pass filter by using a switch when it is determined that the power level of the signal is less than the preset power level (S1250). The communication apparatus measures a power level of the signal having passed through the fourth band pass filter (S1251), determines whether the power level of the signal having passed through the fourth band pass filter is greater than or equal to a preset power level (S1252), determines, as a frequency band of a communication signal, a frequency band corresponding to the fourth band pass filter when it is determined that the power level of the signal is greater than or equal to the preset power level (S1253), and transmits the uplink signal to a fifth band pass filter by using a switch when it is determined that the power level of the signal is less than the preset power level (S1260). The communication apparatus measures a power level of the signal having passed through the fifth band pass filter (S1261), determines whether the power level of the signal having passed through the fifth band pass filter is greater than or equal to a preset power level (S1262), and determines, as a frequency band of a communication signal, a frequency band corresponding to the fifth band pass filter when it is determined that the power level of the signal is greater than or equal to the preset power level (S1263). When the frequency band is determined, the band setting unit sets the communication frequency band (S1270), the output band of the communication signal is determined through a communication signal waveform analysis (S1280), and the output setting unit sets the communication output band (S1290). Since details thereof are the same as described above, a redundant description thereof will be omitted.

The above-described communication device is not limited to the application of the configurations and methods of the above-described embodiments and the entire or part of the embodiments can be selectively combined and configured to allow various modifications.

The invention claimed is:

1. A communication apparatus comprising:
a transceiver configured to transmit and receive a communication signal;
a detector configured to detect a power level of the communication signal received from the transceiver;
a band setter configured to set a communication frequency band;
an output setter configured to set a communication output band; and
a controller configured to:
control an operation of the communication apparatus;
determine a frequency band of the communication signal by analyzing the detected power level of the communication signal;
cause the band setter to set the determined frequency band of the communication signal as the communication frequency band;
determine an output band of the communication signal by analyzing the communication frequency band and a waveform of the communication signal; and
cause the output setter to set the determined output band of the communication signal as the communication output band.

2. The communication apparatus according to claim 1, wherein the communication frequency band comprises Band 1, Band 3, Band 7, Band 8, and Band 20.

3. The communication apparatus according to claim 2, wherein the detector comprises a coupler, a first switch, a second switch, a first band pass filter, a second band pass filter, a third band pass filter, a fourth band pass filter, a fifth band pass filter, and a power detector.

4. The communication apparatus according to claim 3, wherein:
the detector connects each of the first switch and the second switch to a corresponding band pass filter for a preset period of time; and
the power detector determines whether a power level of a signal passed through the corresponding band pass filter exceeds a preset power level.

5. The communication apparatus according to claim 4, wherein the controller is further configured to determine a frequency band corresponding to the band pass filter, through which the signal with the power level exceeding the preset power level passed, as the frequency band of the communication signal based on the power level of the signal determined by the power detector.

6. The communication apparatus according to claim 1, wherein the communication output band comprises Band 1, Band 3, Band 7, Band 8, Band 20, GSM900, and GSM1800.

7. The communication apparatus according to claim 1, wherein:
the band setter comprises a third switch, a fourth switch, a first band pass filter, a second band pass filter, a third band pass filter, a fourth band pass filter, and a fifth band pass filter; and
the controller is further configured to cause the third switch and the fourth switch to be connected to a band pass filter corresponding to the frequency band of the communication signal detected by the detector.

8. The communication apparatus according to claim 7, wherein the controller is further configured to cause the third switch and the fourth switch to be connected to the band pass filter selected in response to a frequency band change signal received from the detector.

9. A communication apparatus comprising:
a transceiver configured to transmit and receive a communication signal;
a band setter configured to set a communication frequency band;
a detector configured to detect a power level of the communication signal passed through the band setter;
an output setter configured to set a communication output band; and
a controller configured to:
control an operation of the communication apparatus;
determine a frequency band of the communication signal by analyzing the detected power level of the communication signal;
cause the band setter to set the determined frequency band of the communication signal as the communication frequency band;
determine an output band of the communication signal by analyzing the communication frequency band and a waveform of the communication signal; and
cause the output setter to set the determined output band of the communication signal as the communication output band.

10. The communication apparatus according to claim 9, wherein the communication frequency band comprises Band 1, Band 3, Band 7, Band 8, and Band 20.

11. The communication apparatus according to claim 10, wherein:
the band setter comprises a first switch, a second switch, a first band pass filter, a second band pass filter, a third band pass filter, a fourth band pass filter, and a fifth band pass filter; and
the detector comprises a coupler and a power detector.

12. The communication apparatus according to claim 11, wherein:
the detector connects each of the first switch and the second switch to a corresponding band pass filter for a preset period of time; and
the power detector determines whether a power level of a signal passed through the corresponding band pass filter exceeds a preset power level.

13. The communication apparatus according to claim 12, wherein the controller is further configured to determine a frequency band of the band pass filter, through which the signal with the power level exceeding the preset power level passed, as the frequency band of the communication signal based on the power level of the signal determined by the power detector.

14. The communication apparatus according to claim 13, wherein the controller is further configured to cause the first switch and the second switch to be connected to a band pass filter selected in response to a frequency band change signal received from the detector.

15. The communication apparatus according to claim 9, wherein the communication output band comprises Band 1, Band 3, Band 7, Band 8, Band 20, GSM900, and GSM1800.

* * * * *